United States Patent
Hurwit et al.

(10) Patent No.: US 10,661,446 B2
(45) Date of Patent: May 26, 2020

(54) JAMMING GRIPPERS WITH STENCIL MOLDINGS

(71) Applicant: Aurora Flight Sciences Corporation, Manassas, VA (US)

(72) Inventors: Daniel Hurwit, Manassas, VA (US); William Bosworth, Cambridge, MA (US)

(73) Assignee: Aurora Flight Sciences Corporation, Manassas, VA (US)

( * ) Notice: Subject to any disclaimer, the term of this patent is extended or adjusted under 35 U.S.C. 154(b) by 124 days.

(21) Appl. No.: 15/946,986

(22) Filed: Apr. 6, 2018

(65) Prior Publication Data
US 2019/0308331 A1  Oct. 10, 2019

(51) Int. Cl.
| | |
|---|---|
| *B25J 15/00* | (2006.01) |
| *B25J 9/16* | (2006.01) |
| *B25J 13/08* | (2006.01) |
| *B25J 9/00* | (2006.01) |
| *B25J 15/12* | (2006.01) |

(52) U.S. Cl.
CPC ......... *B25J 15/0023* (2013.01); *B25J 9/0096* (2013.01); *B25J 9/1697* (2013.01); *B25J 13/08* (2013.01); *B25J 15/009* (2013.01); *B25J 15/12* (2013.01)

(58) Field of Classification Search
CPC ........ B25J 9/0096; B25J 9/1697; B25J 13/08; B25J 15/0023; B25J 15/0095; B25J 15/12; B25J 19/021; B25J 19/04
USPC ......................................................... 294/86.4
See application file for complete search history.

(56) References Cited

U.S. PATENT DOCUMENTS

| | | | | |
|---|---|---|---|---|
| 3,675,962 A | * | 7/1972 | Simpson | B25J 15/0023 294/99.1 |
| 4,561,686 A | * | 12/1985 | Atchley | B66C 1/0206 294/188 |
| 8,240,729 B2 | * | 8/2012 | Vittor | B25J 15/02 294/213 |
| 8,882,165 B2 | * | 11/2014 | Lipson | B25J 15/0023 294/188 |
| 9,067,324 B2 | * | 6/2015 | Matsuoka | B25J 15/0023 |
| 2010/0217436 A1 | * | 8/2010 | Jones | B25J 5/005 700/245 |

* cited by examiner

*Primary Examiner* — Dean J Kramer
(74) *Attorney, Agent, or Firm* — Michael Stanley Tomsa; McAndrews, Held & Malloy, Ltd.; Eugene H. Nahm

(57) ABSTRACT

A robot system having a robot with a jamming gripper is disclosed. The jamming gripper may comprise granular material within a deformable membrane configured to phase transition between a malleable state and a rigid state upon modification of its internal pressure. The phase transition of the gripper may allow the robot to engage and/or grasp a target object by conforming to the shape of the target object while in its malleable state, then transitioning to its rigid state in order to firmly grasp the object. In some situations, the robot may be configured to select and/or engage a stencil before engaging the target object, so as to pre-shape the gripper before engagement with the target object.

20 Claims, 12 Drawing Sheets

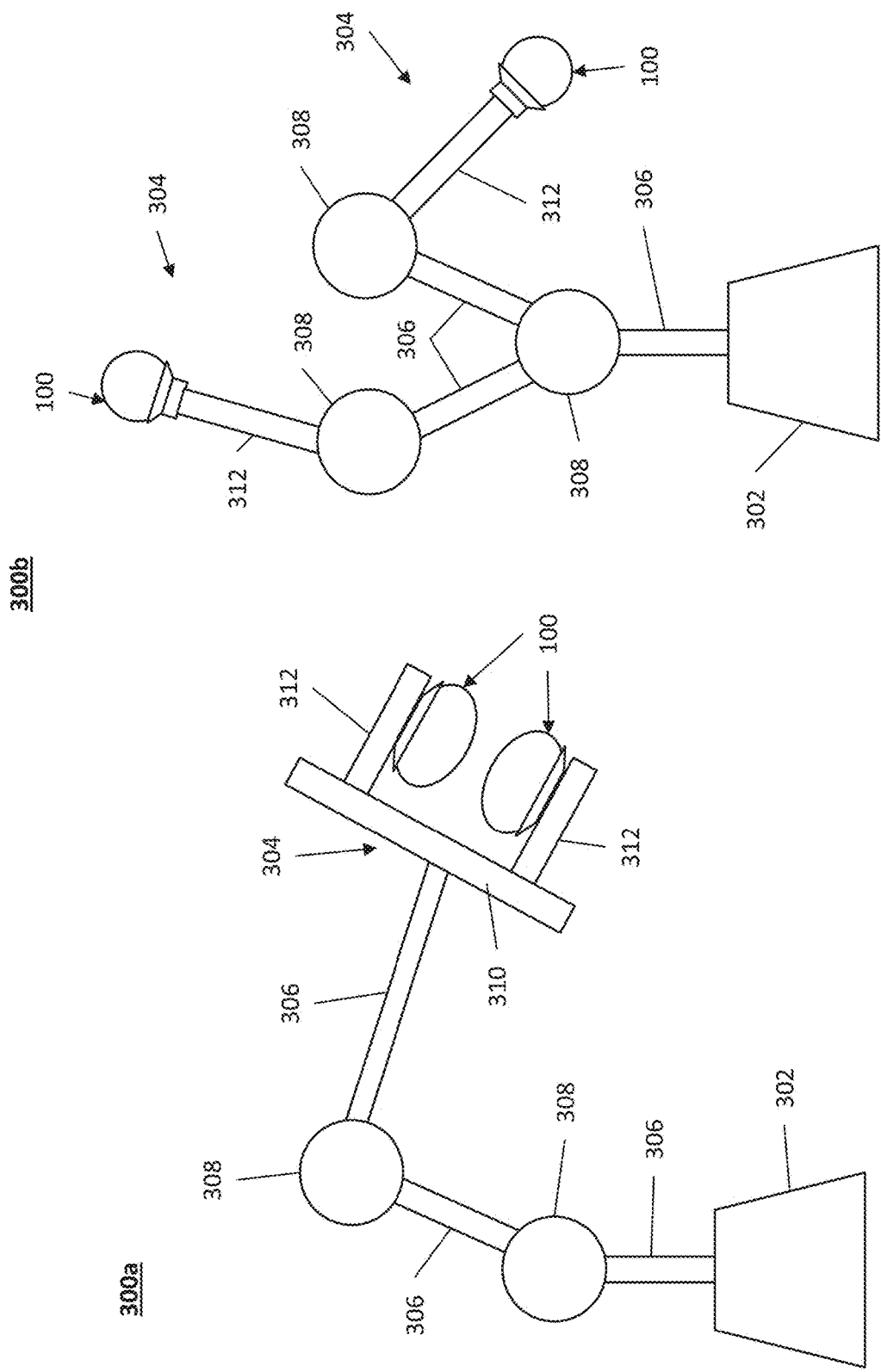

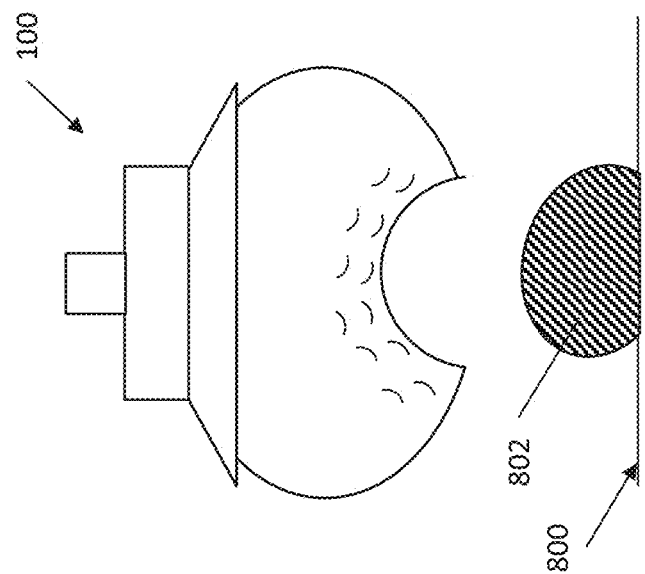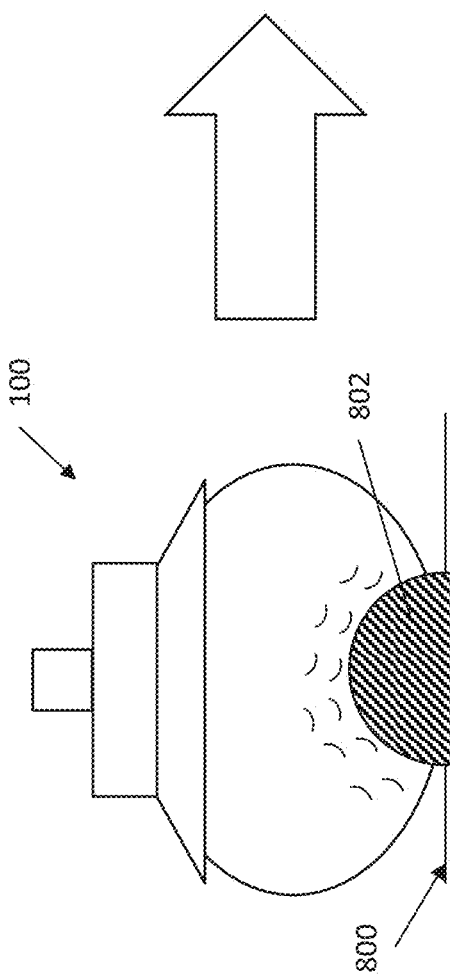

JAMMING GRIPPERS WITH STENCIL MOLDINGS

FIELD

The present disclosure relates to jamming grippers, and more particularly to using stencil moldings to shape a jamming gripper before engagement with a target object.

BACKGROUND

Robot and/or machine arms may be configured with appendages designed to manipulate objects. In some instances, the appendages may be designed to emulate human hands. However, robot emulation of human hand adaptability and dexterity has proven difficult to implement in practice.

Therefore, efforts have been made to develop alternative appendages that are less reliant on imitating human anatomy. One particular alternative involves an appendage having a simple, amorphous, and/or adaptable blob (and/or ball form). However, even these alternative appendages may find it difficult to manipulate some objects, such as, for example, smaller, and/or more delicate objects.

SUMMARY

The present disclosure relates to jamming grippers, and more particularly to using stencil moldings to shape a jamming gripper before engagement with a target object.

According to a first aspect, a robot system for grasping a target object comprises: a robot equipped with an appendage having a gripper, wherein the gripper includes a pressure control port; a pressure regulator fluidly coupled to the gripper via the pressure control port, wherein the pressure regulator is configured to modify an internal pressure of the gripper, so as to phase transition the gripper between a malleable state and a rigid state; and a stencil having a mold to which the gripper may conform when in a malleable state, so as to define a desired rigid form for the gripper.

According to a second aspect, a method is provided for grasping a target object via a gripper that is in communication with a pressure regulator, wherein the gripper comprises a deformable membrane configured to phase transition between a malleable state and a rigid state as a function of pressure imparted by the pressure regulator. The method comprising the steps of: maneuvering the gripper into contact with a stencil while the gripper is in a malleable state, wherein the stencil corresponds at least in part to a shape of the target object in contact with the gripper; transitioning the gripper from the malleable state to the rigid state, such that the gripper conforms to a shape of a mold of the stencil; maneuvering the gripper out of contact with the stencil while the gripper is in the rigid state; and manipulating the target object with the gripper while the gripper is in the rigid state.

In certain aspects, the robot is equipped with an optical sensor to provide an input to the robot system, the optical sensor being arranged to view the stencil, and an actuation mechanism to guide the robot arm toward the stencil based at least in part on the input from the optical sensor.

In certain aspects, the gripper comprises a deformable membrane having a granular material disposed therein.

In certain aspects, the granular material comprises at least one of sand, coffee grounds, beans, rice, or salt.

In certain aspects, the stencil is a dynamic stencil.

In certain aspects, the dynamic stencil comprises a dynamic mold configured to change shape dynamically.

In certain aspects, the dynamic stencil is operably coupled to a user interface and is configured to change shape in response to a user input at the user interface.

In certain aspects, the stencil is coupled to the robot.

In certain aspects, the mold is shaped to approximate a shape of the target object.

In certain aspects, the stencil comprises a plurality of molds.

In certain aspects, the mold is printed via a three-dimensional printer.

In certain aspects, the step of maneuvering the gripper into contact with a stencil comprises maneuvering the gripper based on an input from an optical sensor operably coupled to the gripper, wherein the optical sensor is arranged to view the stencil and to guide the gripper toward the stencil based at least in part on the provided input.

In certain aspects, the gripper is operatively coupled to a robot.

In certain aspects, the stencil comprises a plurality of molds, and wherein the gripper is maneuvered into contact with the mold that corresponds to at least one of a type of manipulation or a characteristic of the target object.

In certain aspects, the characteristic of the target object comprises at least one of a shape of the target object, a material of the target object, a durability of the target object.

DESCRIPTION OF THE DRAWINGS

The foregoing and other objects, features, and advantages of the devices, systems, and methods described herein will be readily understood from the following description of particular embodiments thereof, as illustrated in the accompanying figures, where like reference numbers refer to like structures. The figures are not necessarily to scale, emphasis instead being placed upon illustrating the principles of the devices, systems, and methods described herein.

FIGS. 3a through 3c illustrate the gripper of FIG. 1 in use with various robots.

FIGS. 7a and 7b illustrate an example illustration of a gripper engaging and disengaging a mold.

DETAILED DESCRIPTION

Figure 1:
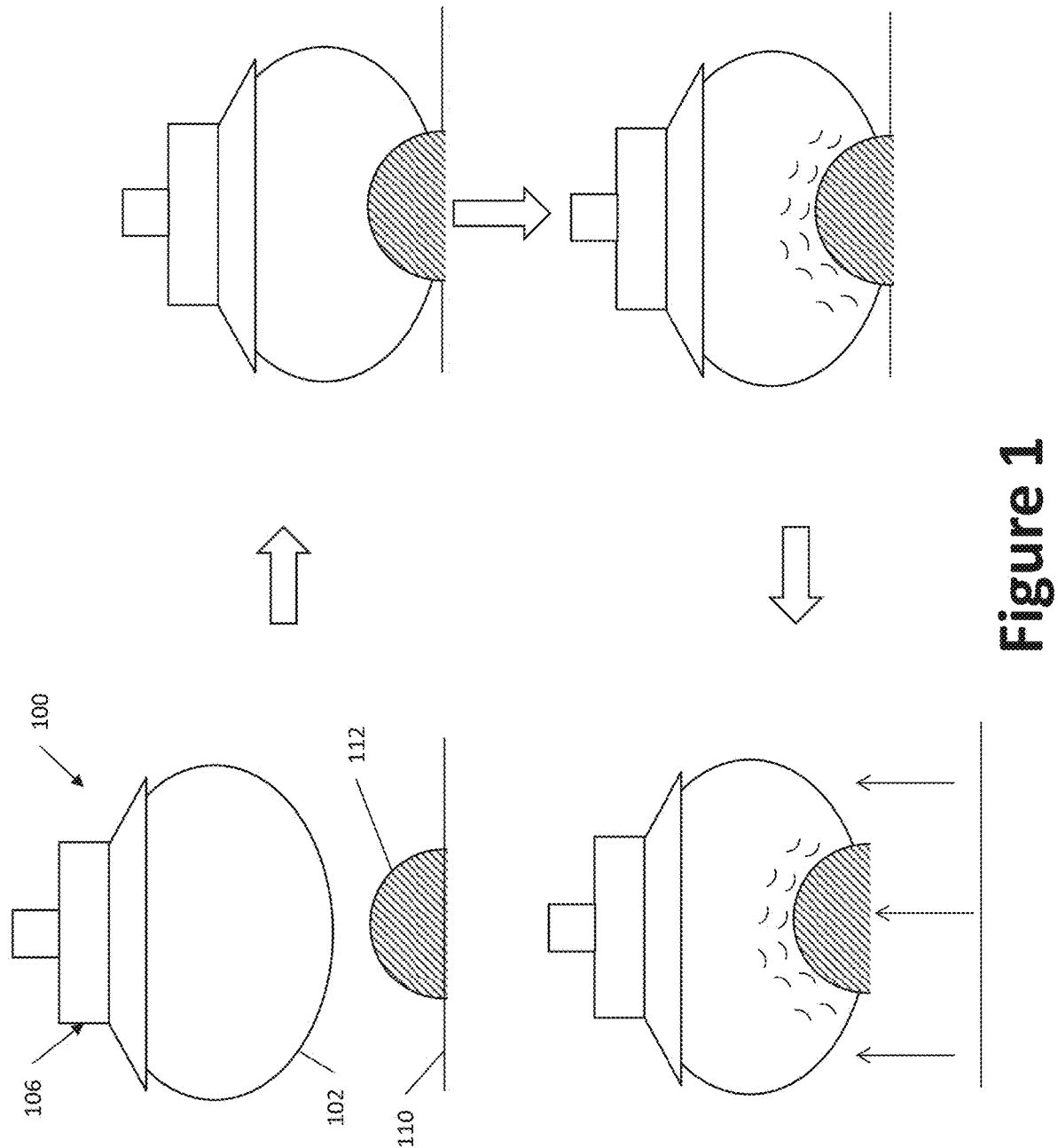
FIG. 1 illustrates an example process of using a gripper.

Preferred embodiments of the present disclosure will be described herein below with reference to the accompanying drawings. The components in the drawings are not necessarily drawn to scale, the emphasis instead being placed upon clearly illustrating the principles of the present embodiments. For instance, the size of an element may be exaggerated for clarity and convenience of description. Moreover, wherever possible, the same reference numbers are used throughout the drawings to refer to the same or like elements of an embodiment. In the following description, well-known functions or constructions are not described in detail because they may obscure the disclosure in unnecessary detail. No language in the specification should be construed as indicating any unclaimed element as essential to the practice of the embodiments. For this application, the following terms and definitions shall apply:

The term "and/or" means any one or more of the items in the list joined by "and/or." As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z".

As used herein, the terms "communicate" and "communicating" refer to (1) transmitting, or otherwise conveying, data from a source to a destination, and/or (2) delivering data to a communications medium, system, channel, network, device, wire, cable, fiber, circuit, and/or link to be conveyed to a destination.

The terms "about" and "approximately," when used to modify or describe a value (or range of values), position, orientation, and/or action, mean reasonably close to that value, range of values, position, orientation, and/or action. Thus, the embodiments described herein are not limited to only the recited values, ranges of values, positions, orientations, and/or actions but rather should include reasonably workable deviations.

The terms "circuits" and/or "circuitry" refer to physical electronic components (i.e., hardware), such as, for example analog and/or digital components, power and/or control elements, and/or a microprocessor, as well as any software and/or firmware ("code") which may configure the hardware, be executed by the hardware, and or otherwise be associated with the hardware.

The terms "coupled," "coupled to," and "coupled with" as used herein, each mean a structural and/or electrical connection, whether attached, affixed, connected, joined, fastened, linked, and/or otherwise secured. As used herein, the term "attach" means to affix, couple, connect, join, fasten, link, and/or otherwise secure. As used herein, the term "connect," means to attach, affix, couple, join, fasten, link, and/or otherwise secure.

The term "operatively coupled" means that a number of elements or assemblies are coupled together, such that as a first element/assembly moves from one state (and/or configuration, orientation, position etc.) to another, a second element/assembly that is operatively coupled to the first element/assembly also moves between one state (and/or configuration, orientation, position etc.) to another. It is noted that a first element may be "operatively coupled" to a second element without the opposite being true.

As used herein, the term "processor" means processing devices, apparatuses, programs, circuits, components, systems, and subsystems, whether implemented in hardware, tangibly embodied software, or both, and whether or not it is programmable. The term "processor" as used herein includes, but is not limited to, one or more computing devices, hardwired circuits, signal-modifying devices and systems, devices and machines for controlling systems, central processing units, programmable devices and systems, field-programmable gate arrays, application-specific integrated circuits, systems on a chip, systems comprising discrete elements and/or circuits, state machines, virtual machines, data processors, processing facilities, and combinations of any of the foregoing. The processor may be, for example, any type of general purpose microprocessor or microcontroller, a digital signal processing (DSP) processor, an application-specific integrated circuit (ASIC). The processor may be coupled to, or integrated with a memory device.

The term "exemplary" means serving as a non-limiting example, instance, or illustration. As utilized herein, the terms "e.g.," and "for example" set off lists of one or more non-limiting examples, instances, or illustrations.

The term "memory" means computer hardware or circuitry to store information for use by a processor and/or other digital device. The memory can be any suitable type of computer memory or any other type of electronic storage medium, such as, for example, read-only memory (ROM), random access memory (RAM), cache memory, compact disc read-only memory (CDROM), electro-optical memory, magneto-optical memory, programmable read-only memory (PROM), erasable programmable read-only memory (EPROM), electrically-erasable programmable read-only memory (EEPROM), a computer-readable medium, or the like.

Figure 2:
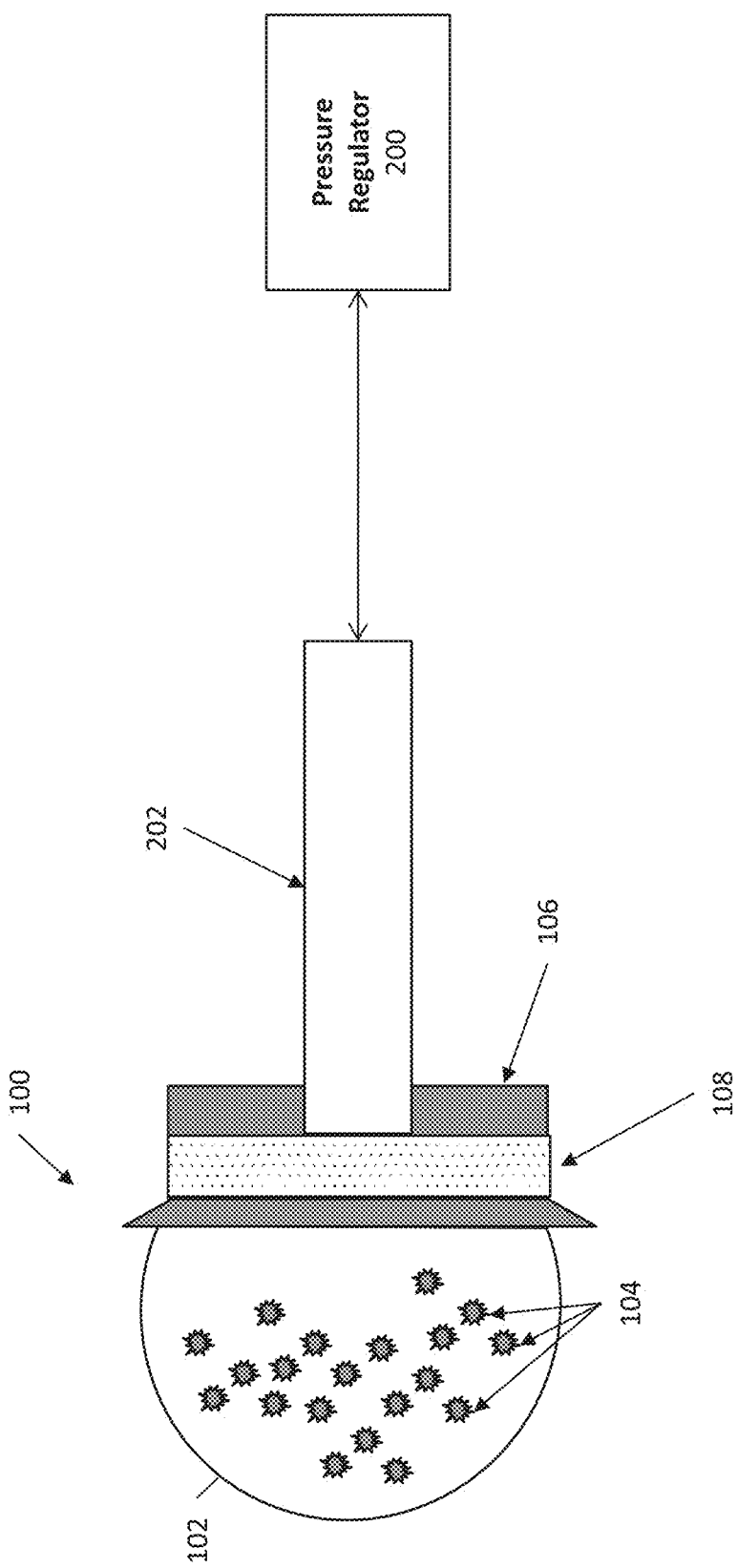
FIG. 2 illustrates certain components of the gripper of FIG. 1.

In comparison to traditional claw grippers, jamming grippers provide additional capabilities that the traditional claw grippers are unable to provide. As shown in FIGS. 1 and 2, a jamming gripper may comprise granular media encapsulated by a flexible rubber skin (e.g., a ball or balloon that is connected to an air pump and/or vacuum). When air is pumped into the ball and/or the vacuum is unpowered, the ball defined by the flexible rubber skin softens and/or becomes compliant. In this state, the gripper resembles a bean bag. The gripper is then pushed against a target object. In its soft state, the ball conforms to the surface, shape, contour, and/or outline of the target object. When the vacuum is powered, air is extracted (i.e., pulled out) of the gripper. The granular media thus compresses and is jammed together. Accordingly, the previously compliant structure becomes stiff and hardens around the shape of the object being grasped. The gripper can thereby grasp objects by being placed over the objects while soft, then hardening around the object through vacuum suction. Positive pressure may also be applied to the gripper to quickly release and/or "throw" objects.

In some examples, the jamming gripper may be formed as a single blob and/or ball. With the single-blob, the robot does not need to precisely place the blob onto a desired object. A drawback of the single-blob is relatively limited grasping force, because there is minimal leverage to squeeze objects. Another drawback intrinsic to jamming grippers is that they are relatively power-hungry since they require operating a vacuum to operate.

In some examples, the jamming gripper may be used in a multi-finger configuration. In a multi-finger configuration, the jamming gripper may be positioned at the distal end of the finger and considered the "fingertip" of a conventional rigid, possibly multi-jointed, finger. Thus, conventional humanoid gripping "fingers" may still be used, and the jamming gripper may be used with the fingers (as the "fingertip") to conform around objects and assist with the grasping.

A potential problem with jamming grippers is that they must press against objects to generate the force needed to re-shape the gripper. For fragile objects, the force required to create the gripper shapes may break the parts. For smaller objects, the force required to create the finger shapes may be difficult and/or near impossible to generate by pressing into the objects.

To address this need, disclosed herein is a method of grasping objects with a jamming gripper by utilizing static pre-designed and/or dynamically re-designable molds to shape the jamming gripper before moving to engage an object. One benefit of the method of pre-shaping the fingertips is that it enables fingers to grasp complex objects using minimal force and/or active degrees of freedom. Pre-shaping the fingers can enhance both high-force and low-force grasping. An egg is an example of low-force grasping object. The gripper can first grasp a mold of an egg (printed, for example, using a three-dimensional (3d) printer, or made through other means). The mold of an object can generally withstand a much higher compressive force generated by the robot than the object itself (e.g., an egg) to form around the shape, and then the gripper can move to the actual object with an optimal grasping shape. An example of a high-force grasping object is a screw-driver with a hexagonal-shaped handle. The jamming gripper can be pre-shaped into a hexagonal screw-driver handle shape, and then grasp the screw driver's handle with a stiff pre-determined shape. Accordingly, the pre-shaped jamming gripper offers a number of advantages, including handling of fragile objects, precision gripping, and re-moldability (e.g., the gripper can be reshaped after each use to assume a new shape). Indeed, using a pre-shaped gripper requires less pressure re-shape the mold in order to grasp the object, which is advantageous with fragile objects without exerting unnecessary grasping pressure. Further, a pre-shaped jamming gripper can achieve a perfect (or near-perfect) conformation to the shape of the object.

Pre-shaping the gripper may additionally, or alternatively, be important for using the gripper to punch or tap—i.e., hitting quickly, not thread tapping—an object. Using a mold, a jamming gripper could be quickly reshaped to have a relatively sharp head, which could be used to create a highly localized tap.

The use of molds may enable the jamming gripper to be re-shaped before moving to manipulate an object. Pre-shaping the jamming gripper will allow the gripper to have unique geometry without the need for many active degrees of freedom on the robot. To provide active degrees of freedom, the robot may employ multi-joint "hands" and "fingers," akin to a human hand or humanoid robot hand. It is difficult to replicate the dexterity of human hands, especially in a compact, low weight, and reasonable cost device; however the disclosed jamming grippers can be used, which are considerably less expensive and can grasp a wide range of objects (e.g. of various shapes and sizes). The use of pre-shaping could aid both grasping and tapping (e.g., thwacking and hammering).

The disclosed system may comprise one or more robot arms, where each robot arm uses one or more jamming grippers. The jamming grippers may be the "finger tips" of a multi-fingered or single-fingered hand. The jamming grippers may be configured to grasp and/or pickup one or more objects. One or more of the objects may have unique geometric features. The system may further include a mold (active and/or passive) that mimics the unique geometric features of the objects to be grasped. The mold may be placed in/on the robot and/or in the robot's workspace such that the robot can use the mold to pre-shape the gripper. Possibly, the objects in question may be designed with specific features designed for carrying—e.g., a specific hole or ridge pattern—which enables the jamming-gripper robot to grasp the object(s). Some desired gripper shapes could be created by operating the robot dynamically while the fingers interacted with (hard) surfaces. For example, a sharp/tubular finger could be created by rolling the finger on a table. Dynamic finger shaping could be considered another mold method.

FIG. 1 illustrates an example jamming gripper 100. The jamming gripper 100 may be placed at a distal end of an actuated arm (e.g., a robot arm) at a manipulator. The jamming gripper 100 may include a deformable membrane 102, similar to a balloon and/or glove, for example. The deformable membrane 102 may comprise elastic, rubber, polymer, latex, and/or other appropriate material. As shown in FIG. 2, the deformable membrane 102 may be shaped to contain (and/or retain) a granular material 104 (e.g., sand, coffee grounds, beans, rice, salt, silica, etc.). The deformable membrane 102 may be coupled to a housing 106. The housing 106 may include a pressure control port 108 (e.g., a fluid port). In some examples, the pressure control port 108 may comprise a porous filter, such as a wire mesh, a porous fabric, a grate, a screen, a netting, and/or some other porous partition, for example. The pressure control port 108 may be fluidly coupled to a pressure regulator 200 through appropriate conduits 202 (e.g., one or more tubes, pipes, ducts, channels, hoses etc.) or other means. In some examples, the pressure regulator 200 may comprise an air pump, vacuum pump, and/or air compressor. The pressure regulator 200 may be configured to modify an internal pressure of the jamming gripper 100, so as to phase transition the jamming gripper 100 and/or the granular material 104 within the jamming gripper 100 from a malleable state to a rigid state.

In operation, the jamming gripper 100 may exploit a jamming effect of granular material 104. Jamming refers to the process by which the viscosity of granular material 104 increases with increasing particle density. In its malleable state, the granular material 104 within the deformable membrane 102 of the jamming gripper 100 may be loosely compacted with low density. Fluid (e.g., gas, air, liquid, plasma, etc.) mixed in with the granular material 104 help keep the density of the granular material 104 low within the deformable membrane 102. The deformable membrane 102 may loosely conform to virtually any shape the granular material 104 imparts upon it. As shown in FIG. 1, the granular material 104 generally imparts a spherical and/or ball shape to the jamming gripper 100 when the jamming gripper 100 is suspended above the surface 110. In such a state, the jamming gripper 100 may be relatively malleable; resembling that of a bean bag that may be relatively easily shaped (and/or reshaped, deformed, distorted, fashioned, shaped, molded etc.).

The density of the granular material 104 within the deformable membrane 102 may be modified by the pressure regulator. In some examples, the pressure regulator 200 may be configured to impart positive and/or negative pressure upon the granular material 104 of the deformable membrane 102 through the pressure control port 108. In some examples, the pressure regulator 200 may be configured to impart a vacuum to the granular material 104 of the deformable membrane 102 through the pressure control port 108. Thereby, fluid (typically gas or air) may be suctioned out of the deformable membrane 102 through the pressure control port 108. The deformable membrane 102 and/or the granular material 104 within the deformable membrane 102 may also be suctioned and/or pulled towards the pressure control port 108. With the fluid removed, the granular material 104 within the deformable membrane may become increasingly dense. With the increased density, the jamming gripper 100 may be much less malleable, and much more rigid, similar to a solid. The filtering pores of the pressure control port 108 may be configured to prevent the granular material 104 from moving in and/or out of the deformable membrane 102 through the pressure control port 108, while still allowing fluid to move in and/or out of the deformable membrane 102 through the pressure control port 108. Instead of moving through the pressure control port 108, the granular material 104 may be compressed tightly together, solidifying into whatever shape it was in just moments before the vacuum was applied. This is considered the rigid state of the jamming gripper 100. When the vacuum is removed (and/or positive pressure is applied), the jamming gripper 100 may transition back to a more malleable state.

Thus, the jamming gripper 100 may phase transition between a fluid-like malleable state and a more solid-like rigid state through modification of the density of the granular material 104 and/or the internal pressure of the deformable membrane 102. This pseudo-phase transition arises out of the inherent solid-liquid duality of granular systems, and/or the jamming effect of granular material. When the jamming gripper 100 is in the solid-like rigid phase, the jamming gripper 100 and/or granular material 104 is said to be jammed.

As shown in FIG. 1, the jamming gripper 100 may use its jamming phase transition to engage, grip, and/or manipulate objects. Initially in FIG. 1, the jamming gripper 100 is suspended above the surface 110 in its malleable state. More specifically, the jamming gripper 100 is suspended over a target object 112 on the surface 110. The jamming gripper 100 is then lowered onto the target object 112. In its malleable state, the deformable membrane 102 of the jamming gripper 100 shifts and shapes itself around the target object 112. Then the pressure regulator 200 may modify the air pressure in the jamming gripper 100, transitioning the jamming gripper 100 from a malleable state to a jammed and/or rigid state. In the jammed and/or rigid state, the deformable membrane 102 takes on (e.g., assumes/conforms to) the characteristics of a solid, and firmly grips target object 112. The jamming gripper 100 is then raised, still in its jammed, gripping, rigid state, thereby raising the target object 112 in its grasp. The jamming gripper 100 may go on to move and/or manipulate the target object 112 as it sees fit, according to some program and/or user input from a user input device (e.g., user interface 404), for example. The jamming gripper 100 may drop and/or release the target object 112 when the pressure regulator 200 returns the pressure within the deformable membrane 102 to the atmospheric pressure, thereby transitioning the jamming gripper 100 back to a malleable state and releasing the object from the grasp of the jamming gripper 100.

Figure 3C:
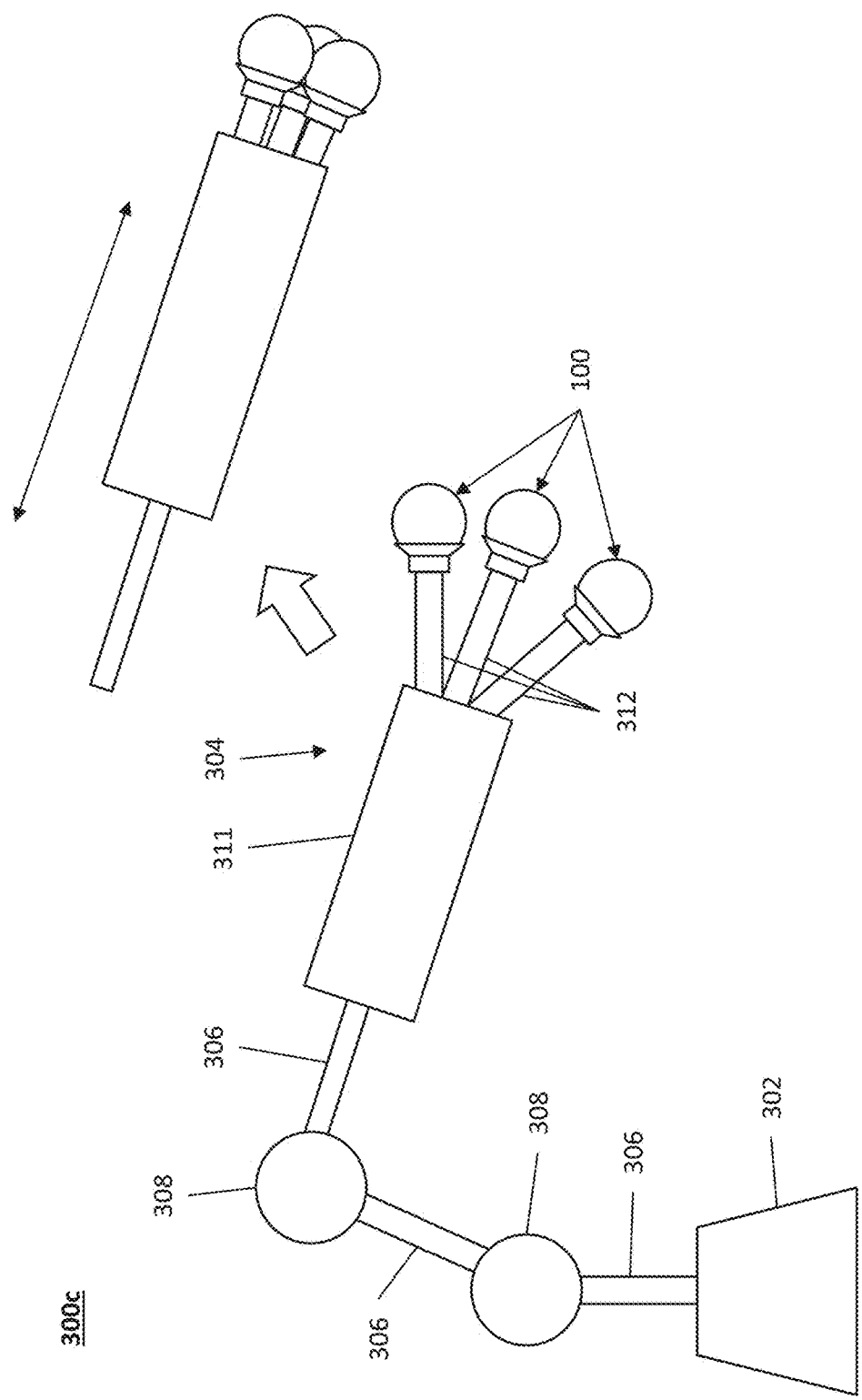

FIGS. 3a through 3c illustrate the jamming gripper 100 in use with various robots 300. Each robot 300 may comprise a base 302 coupled to at least one manipulator 304 via a set of arms 306. In some examples, the robot 300 may include multiple manipulators 304. In some examples, the robot 300 and/or base 302 may be fixed and/or stationary. In some examples, the robot 300 may be part of and/or coupled to a mobile chassis (and/or frame, body, structure, etc.) via the base 302 and/or other component(s). The arms 306 of the robot 300 may be coupled together via one or more joints 308. The joints 308 may allow the arms 306 to be moved, rotated, directed, and/or otherwise maneuvered in different directions, angles, inclinations, and/or orientations with respect to the base 302 and/or other arms 306. In some examples, the joints 308 may be multi degree of freedom joints. In some examples, one or more of the arms 306 may be extendable and/or retractable, such as through a telescoping configuration, for example.

In some aspect, to enable movement in multiple degrees of freedom movement, the robot arm may comprise a plurality of arm segments (whether linear, curved, or angled) joined using a plurality of hinged or pivotal joints. The robot arm may comprise a gripper 100 at its distal end. The gripper 100 may be coupled to the arm 306 via a multiple-DOF joint 308. The base 302 of the arm 306 may be rotatable and slideably coupled to a frame to enable a planar motion of the robot 300 relative to the ground surface.

In the example of FIG. 3a, the robot 300a includes three arms 306 and two joints 308. In some examples, the robot 300a may comprise additional arms 306 and/or joints 308, and/or fewer arms 306 and/or joints 308. In the example of FIG. 3a, the robot 300a includes a manipulator 304 coupled to an arm 306. The manipulator 304 may include a hand 310 having multiple fingers 312. In some examples, the hand 310 of the manipulator 304 may be rotatable about and/or relative to the arm 306 to which it is connected. In some examples there may be one or more additional joints connecting the arm 306 and the manipulator 304 to enable such rotation. The fingers 312 may be configured to move relative (along and/or with respect) to the hand 310. For example, the fingers 312 may be configured to move towards, parallel to, and/or away from each other along the hand 310. In some examples, one or more of the fingers 312 may be configured to extend and/or retract from the hand 310, such as with a telescoping configuration, for example. In some examples, each finger 312 may be configured to move (and/or extend and/or retract) independently of any other finger 312. In some examples, movement (and/or extension and/or retraction) of the fingers 312 may be coordinated, such that movement of one finger 312 may trigger similar, approximately opposite, and/or corresponding movement from another finger 312.

Each finger 312 may comprise one or more jamming grippers 100. In the example of FIG. 3a, the hand 310 of the robot 300a may include two fingers 312, and each finger 312 may include a jamming gripper 100. In some examples, the robot 300a may instead have three or more fingers 312 and/or jamming grippers 100. In some examples, each finger 312 may have multiple jamming grippers 100. In some examples, each jamming gripper 100 may be configured to move along the surface of its finger 312. In some examples, each jamming gripper 100 may be configured to move independently of any other jamming gripper 100. In some examples, movement of the jamming grippers 100 may be coordinated, such that movement of one jamming gripper 100 may trigger similar, approximately opposite, and/or corresponding movement from another jamming gripper 100. In some examples, each jamming gripper 100 may be coupled to its own pressure regulator 200 through its own pressure control port 108. In some examples, the jamming grippers 100 may share a single pressure regulator 200 and/or pressure control port 108. In examples where the jamming grippers 100 share a single pressure control port 108, an additional pressure control port 108 may be positioned in the hand 310, arm 306, and/or joint 308, in addition to the pressure control port 108 in the housing 106 of each jamming gripper 100. The pressure regulator(s) 200 may be positioned in the base 302, arm 306, joint 308, and/or manipulator. The pressure regulator(s) 200 may be operatively coupled to the pressure control port(s) 108 of the jamming grippers 100 through appropriate means (e.g., tubes, pipes, conduits, ducts, channels, hoses etc.).

FIG. 3b illustrates another example robot 300b. The robot 300b of FIG. 3b is similar to the robot 300b of FIG. 3a. However, rather than having a manipulator 304 with a hand 310 and multiple fingers 312 like the robot 300a of FIG. 3a, the robot 300b of FIG. 3b includes a simplified manipulator 304, having just one finger 312 with one jamming gripper 100. In the example of FIG. 3b, the robot 300b includes two manipulators 304. In some examples, the robot 300b may include only one manipulator 304, or three or more manipulators 304. In some examples, the robot 300b may include more or less arms 306 and/or joints 308 to accommodate its manipulators 304 and the desired dexterity of the manipulators 304.

FIG. 3c illustrates another example robot 300c. The robot 300c of FIG. 3c is similar to the robots 300a, 300b of FIGS. 3a and 3b. However, the manipulator of robot 300c is different. The manipulator of the robot 300c includes multiple fingers 312 contained within a sheath 311. In some examples, the sheath 311 may be cylindrical, spherical, cubical, or some other shape. The fingers 312 may be movably mounted within the sheath, such that the fingers 312 may move relatively freely with relation to one another. In some examples, one or more of the fingers 312 may be mounted to one or more joints within the sheath 311 that allow this movement. Each finger 312 may include a jamming gripper 100.

The sheath 311 may be substantially hollow to accommodate the fingers 312. In some examples, the sheath 311 may have a larger circumference and/or surface area at an end proximal its fingers 312 than at its other end. The sheath 311 may be configured to move forwards and/or backwards along its arm 306. In some examples, the sheath 311 may alternatively, or additionally, be configured to extend and/or retract towards and/or away from the jamming grippers 100, such as with a telescoping configuration, for example. By moving and/or extending forward along the arm 306 towards the jamming grippers 100, the sheath 311 may urge the fingers 312 and/or jamming grippers 100 to contract together. This may be useful for grasping and/or otherwise manipulating objects, for example. By moving and/or retracting backwards along the arm 306 away from the jamming grippers 100, the jamming grippers 100 may be allowed to spread apart, which may be useful for releasing and/or otherwise manipulating an object. In some examples, the fingers may be biased (e.g., spring biased) such that the fingers 312 will spread apart in the absence of some other force and/or urging (by the sheath 311, for example).

Figure 4:
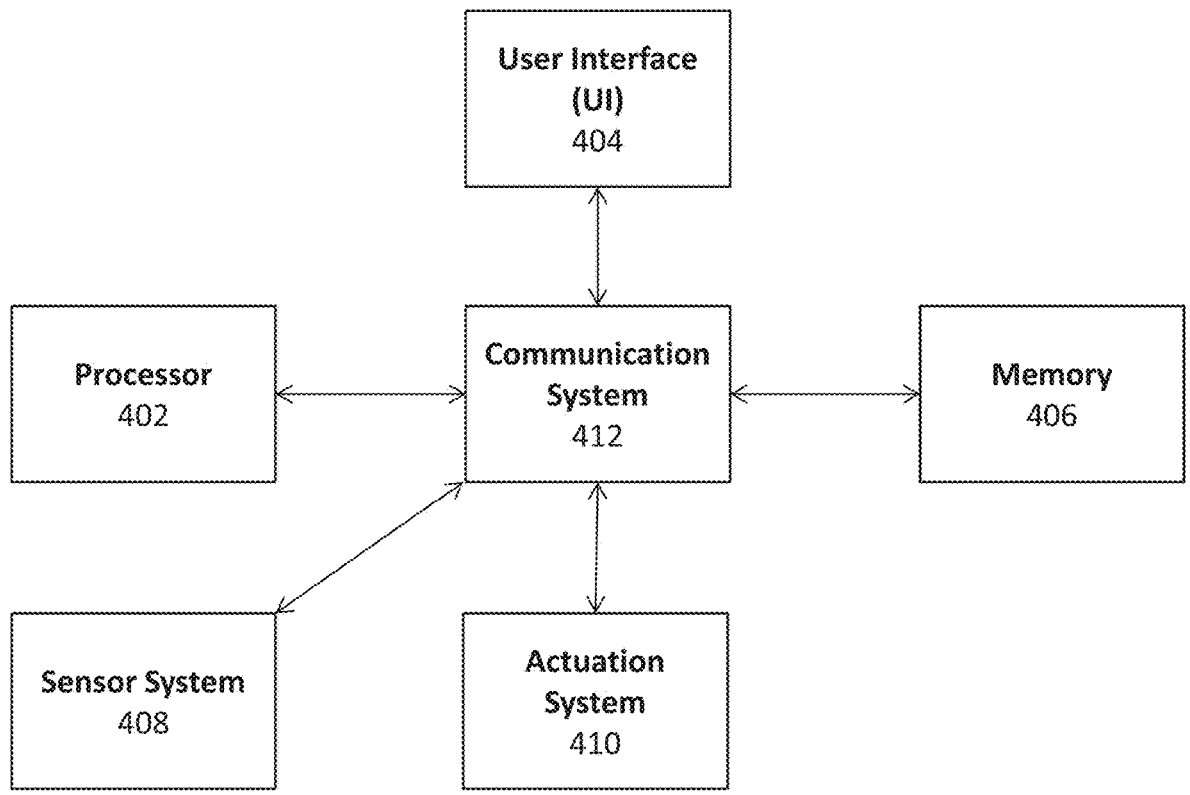
FIG. 4 illustrates a block diagram illustrating a component architecture of the various robots of FIGS. 3a through 3c.

As shown in FIG. 4, each robot 300 may include a processor 402, a user interface (UI) 404, a memory 406, a sensor system 408, and an actuation system 410, coupled together through a communication system 412. The robot 300 may also comprise a power system (not shown) for energizing and/or providing electrical (and/or other) power to the robot 300.

The communication system 412 may comprise appropriate electrical wiring, cables, cords, and/or conductors to electrically and/or communicatively couple the processor 402, user interface 404, memory 406, and/or actuation system 410. The communication system 412 may further comprise one or more receivers, transmitters, and/or transceivers for wireless communication. Such wireless communication may be conducted, for example, through radio frequency (RF) communication, Bluetooth, near field communication (NFC), a cellular network, Wi-Fi, sonic and/or ultrasonic transmissions, microwave transmissions, optical transmissions, electromagnetic induction, and/or other appropriate techniques. The communication system 412 may include appropriate encoders and/or decoders to send and/or receive communications.

The actuation system 410 may comprise the pressure regulator 200 in conjunction with the manipulators 304. The actuation system 410 may further comprise actuation mechanisms for moving and/or maneuvering the arms 306, hands 310, fingers 312, sheath 311, and/or other mechanisms. In examples where the robot 300 is mobile, the actuation system 410 may comprise a mobility system for moving the robot 300. The actuation system 410 may comprise one or more appropriate motors, linkages, drive trains, power sources, and/or other components necessary for its function. The actuation system 410 may comprise one or more controllers configured to coordinate operation of the actuation system 410.

The user interface (UI) 404 may be configured to receive user input, locally and/or from a remote device via the communication system 412. The user interface 404 may include a local interface, such as a display and/or terminal. The terminal may include alphanumeric input capabilities. The terminal may additionally, or alternatively, include mouse input capabilities. The terminal may additionally, or alternatively, include voice recognition. The display may be a touch screen display, configured to receive touch input. The display may include traditional auditory and/or visual outputs, as well as outputs configured for auditory and/or visually impaired users. In some examples, the user interface 404 may include other systems for receiving information locally from a user, such as, for example, one or more universal serial bus (USB) ports, compact disc (CD) drives, digital video disc (DVD) drives, Fire Wire ports (and/or other IEEE 1394 ports), etc.

The memory 406 may store programmable instructions for operation of the robot 300. The programmable instructions may be received and/or updated through the user interface 404 and/or communication system 412. In some examples, the programmable instructions stored by the memory 406 may be received from some other source. The memory 406 may additionally, or alternatively, store other files and/or information used by the robot 300.

The programmable instructions may comprise instructions readable by the processor 402. The processor 402 may be configured to process input received via the user interface 404 and/or the communication system 412. The processor 402 may additionally, or alternatively, be configured to read the programmable instructions in the memory 406. The processor may additionally, or alternatively, be configured issue commands to the actuation system 410 to control the robot 300 based on the processed input(s) and/or programmable instructions.

The sensor system 408 may comprise any number of sensors, detectors, measurement devices, etc. configured to analyze the robot 300 and/or the environment surrounding the robot 300. The sensor system 408 may include, for example, cameras, microphones, audio sensors, optical sensors, proximity sensors, distance sensors, motion sensors, ultrasonic sensors, temperature sensors, pressure sensors, accelerometers, gyroscopes, magnetometers, and/or other appropriate devices. The sensor system 408 may relay information about the robot 300 and/or the surrounding environment to the processor 402, user interface 404, actuation system 410, and/or memory, through the communication system 412, to assist the robot 300 in performing its tasks.

In some aspects, the robot arm may operate based on an input from an optical sensor. The optical sensor may be positioned at the end effector of the robotic arm. The optical sensor may be utilized to guide the movement of the robotic arm. The location, orientation, position, and/or shape of an object may be captured through imaging by the optical sensor which may be utilized to identify the object (i.e., the mold or the target object) in its field of view. The actuation system 410 may be in communication with the optical sensor, where a control signal is determined by the actuation system 410 based on an input from the optical sensor to manipulate the arms 306, hands 310, fingers 312, sheath 311, and/or other mechanisms. In some examples, the optical sensor may be a camera mounted at the end effector or an arm of the robot arm. The camera mounted to the robot arm can be manipulated to view surfaces and objects at various locations and angles within its field of view. Thus, the optical sensor may be used to guide the grippers to the target object.

Figure 5:
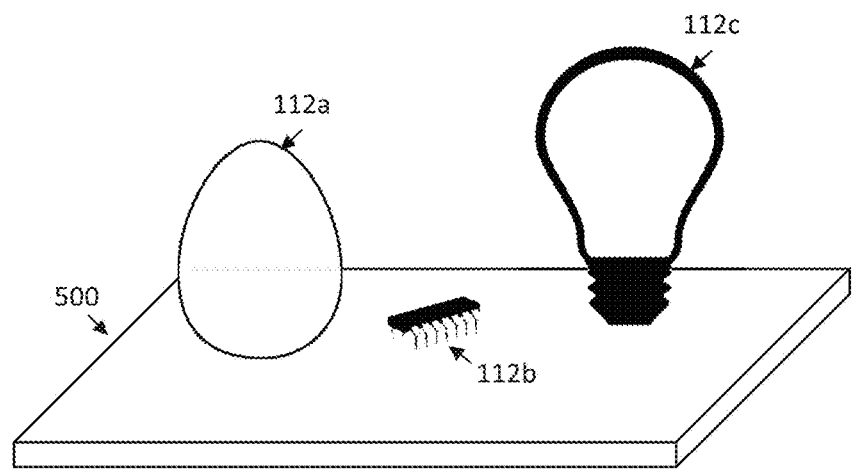
FIG. 5 illustrates a perspective view of example target objects in a workspace.

The robot 300 may be programmed, directed, and/or otherwise configured to engage certain target objects 112 in a workspace 500. The workspace 500 may be, for example, a factory floor, an assembly area, a warehouse, a room, an underground area, a vehicle (e.g., car, truck, and aircraft), etc. The workspace 500 may contain target objects 112 that are small, delicate, oddly/uniquely shaped, and/or otherwise difficult to engage, grasp, and/or otherwise manipulate. For example, as shown in FIG. 5, the target object 112 may be an egg 112a that is delicate, with a fragile shell that may be easily broken. Alternatively, or additionally, the target object 112 may be a microchip 112b that is small, delicate, and easily damaged. Alternatively, or additionally, the target object 112 may be a lightbulb 112c that is fragile and easily broken. Thus, the robot 300 may use a three-dimensional stencil 800 to first configure the shape of its gripper(s) 100 before attempting to engage the target object 112.

Figure 6:
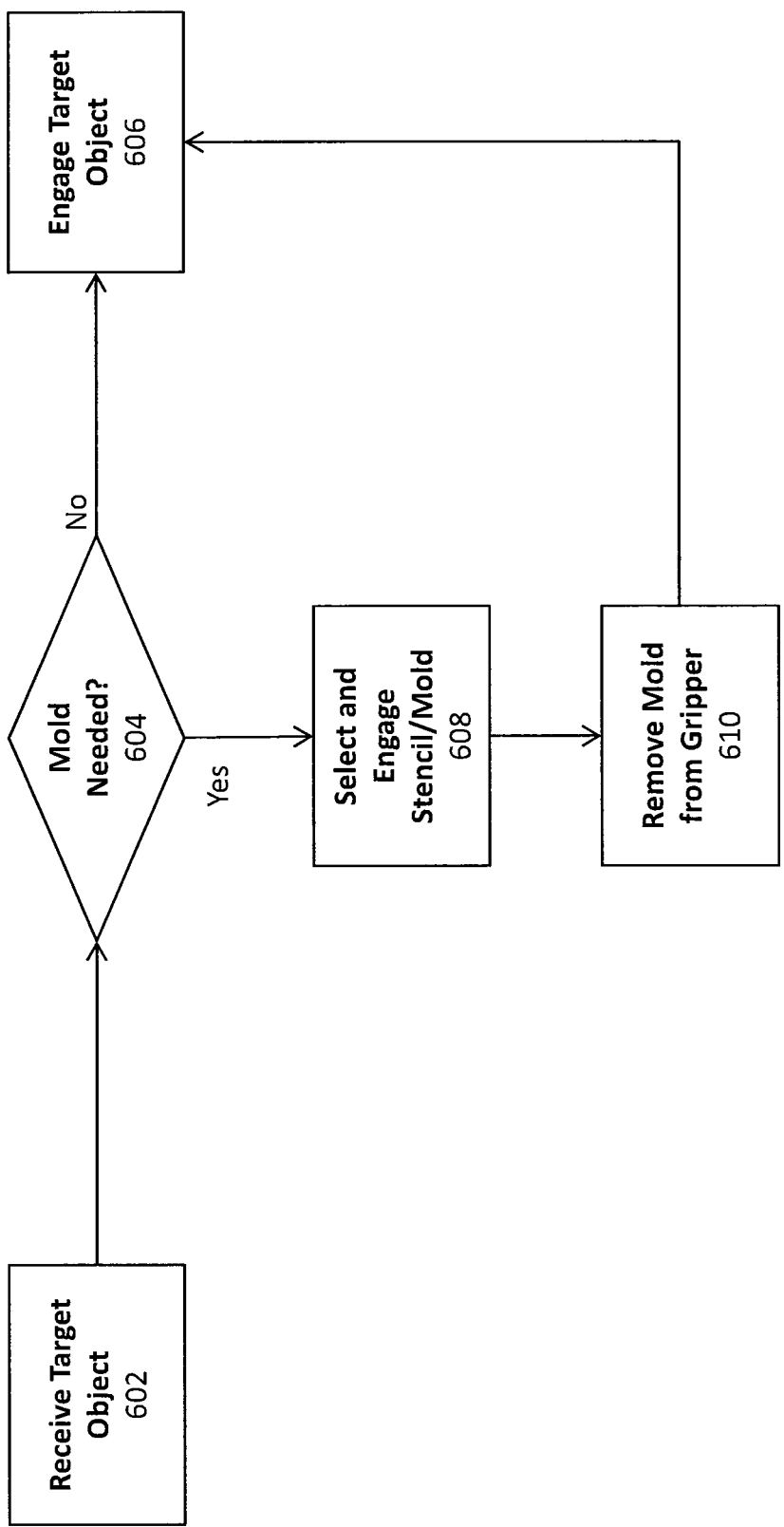
FIG. 6 illustrates a block diagram illustrating an example operation of the robots of FIGS. 3a through 3c.

FIG. 6 shows an example operation of the robot 300. At step 602, the robot 300 may be configured to receive a target object. The target object may be received via the user interface 404 or from memory 406 via a programmed operation. At step 604, the robot 300 may determine whether a stencil and/or mold 800 are needed to engage the target object 112. As part of the determination, the robot 300 may consider characteristics of the target object 112. Target object 112 characteristics may comprise, for example, size, shape, material, durability, fragility, proximity, position, speed, acceleration, mobility, color, density, weight, and/or other appropriate properties and/or attributes. The determination may additionally, or alternatively, be made using information from the sensor system 408. For example, the sensor system 408 may detect the characteristics of the target object 112 automatically. In some examples, the target object 112 may be imprinted with a bar code and/or two-dimensional code (e.g., QR codes) that the sensor system 408 is configured to read and that may be linked to and/or associated with target object 112 information and/or characteristics that may assist the robot 300 in making a determination. The determination may additionally, or alternatively, use information received via the user interface 404 and/or the memory 406. For example, the memory 406 may store information regarding the characteristics of each target object 112, and the robot may use these characteristics to determine if a stencil is needed. In some examples, the memory may store information regarding ranges of measurement values and weights to assign to those values in certain circumstances. In some examples, the robot may use the sensor system 408 to measure characteristics of the target object and the processor 402 may implement an algorithm using the measured values and the stored ranges and/or weights to make a determination as to whether a stencil is needed.

If no stencil and/or mold are needed, then the robot 300 may directly engage the target object 112 at step 606. Engagement may refer to grasping, striking, tapping, moving, throwing, catching, carrying, pushing, pulling, rotating, twisting, opening, closing, and/or otherwise interacting with an object. If a stencil/mold is needed, the robot 300 may first select and/or engage the stencil/mold at step 608. The robot 300 may select the stencil/mold based at least in part on the characteristics of the target object(s) 112, and/or the characteristics of the available stencils/molds. The robot 300 may additionally, or alternatively, consider the proximity to, availability of, and/or cost of engaging the available stencils/molds and/or the target object(s) 112. The robot 300 may additionally or alternatively, consider the method and/or type of intended engagement.

The gripper may engage the stencil/mold by pressing against and/or into the mold while in the malleable state, then transitioning to the rigid state, so as to take on a rigid shape of the stencil. Once the jamming gripper 100 has conformed to the appropriate shape using the mold, the stencil/mold may be removed from the jamming gripper 100 at step 610. Depending on the shape of the stencil/mold, removal of the jamming gripper 100 from the stencil/mold may require some force, manipulation, and/or maneuvering. In some examples, the stencil and/or mold may be firmly attached to a floor, wall, and/or other surface so as to provide sufficient resistance for the robot 300 to disengage from the stencil/mold without carrying and/or moving the stencil/mold with it. In some examples, the stencil/mold may be held by, coupled to, and/or retained on/in another robot 300 and/or otherwise movable away from the jamming gripper 100, so as to actively assist in disengagement from the jamming gripper 100. Once the stencil/mold has been removed, the robot 300 may engage the target object 112 using the shaped and/or molded jamming gripper 100 at step 610.

FIGS. 7a and 7b illustrate a simple example illustration of a jamming gripper 100 engaging and disengaging a mold 802. In the example illustration of FIG. 7a, the jamming gripper 100 has engaged a mold 802. The engagement process is very similar to the engagement in FIG. 1. The jamming gripper 100 may be lowered onto (from above), pressed against (from the side), and/or otherwise brought into contact with the mold 802 while in its malleable state. In its malleable state, the deformable membrane 102 of the jamming gripper 100 may shift and/or shape itself around the mold 802. Then the pressure regulator 200 may modify the air pressure (e.g., vacuum the air) in the jamming gripper 100, transitioning the jamming gripper 100 from a malleable state to a jammed and/or rigid state. In the jammed and/or rigid state, the deformable membrane 102 may take on the characteristics of a solid, and firmly grip the mold 802. As shown in FIG. 7b, the jamming gripper 100 may then be raised (and/or otherwise moved) away from the mold 802, still in its jammed, gripping, rigid state. However, instead of raising the mold 802 as the gripper raises the object in FIG. 1, the mold 802 may remain firmly attached to the stencil 800 (and/or ground, wall, other robot 300 and/or other surface). Thus, the jamming gripper 100 may disengage (and/or separate, detach, extricate from, release, disconnect, uncouple, etc.) from the mold 802 and/or move away from the mold 802 while still in its rigid state. The jamming gripper 100 may then go on to engage with a target object while still in its rigid state, and with the shape impressed upon it by the mold 802.

In some examples, the jamming gripper 100 may directly engage the target object 112 in its rigid state after being shaped by the mold 802. In some examples, the jamming gripper 100 may come close to engagement, then transition to its malleable state to allow the deformable membrane 102 to conform more closely to the shape of the target object 112. In such an example, the stencil 800 and/or mold 802 may allow the gripper to approximate the shape of the target object 112, which may allow the jamming gripper 100 to maneuver to a more favorable position and/or orientation with respect to the target object 112. Once in that position and/or orientation, the jamming gripper 100 may transition to its malleable state, thereby allowing the deformable membrane 102 to relax and conform itself to the actual shape of the target object 112. Thereafter, the jamming gripper 100 may once again transition to a rigid state and proceed with engagement of the target object 112.

In some examples, the jamming gripper 100 may engage with more than one mold 802 before engaging with the target object 112. For example, the jamming gripper 100 may engage with a mold. Various types of mold 802a, 802b, 802c, 802d, 802e, and 802f (hereinafter collectively referred to as mold 802) are provided as examples in FIG. 8a. Once the jamming gripper 100 engages with the mold 802, the jamming gripper 100 enters into its rigid state, remove itself from the mold 802 still in its rigid state, then come close to engaging with another mold 802, transition to its malleable state, directly engage to the mold 802, transition to its rigid state, and so on. In such a way, a jamming gripper 100 may progressively refine its shape to a more precise contour through a series of phase transitions and/or mold 802 engagements. In some examples, such a progressive refinement may be done to shape a point, a slim rod, a key, a precise arrangement of ridges, depressions, contours, etc., and/or some other precision molded shape.

Figures 8A, 8B:
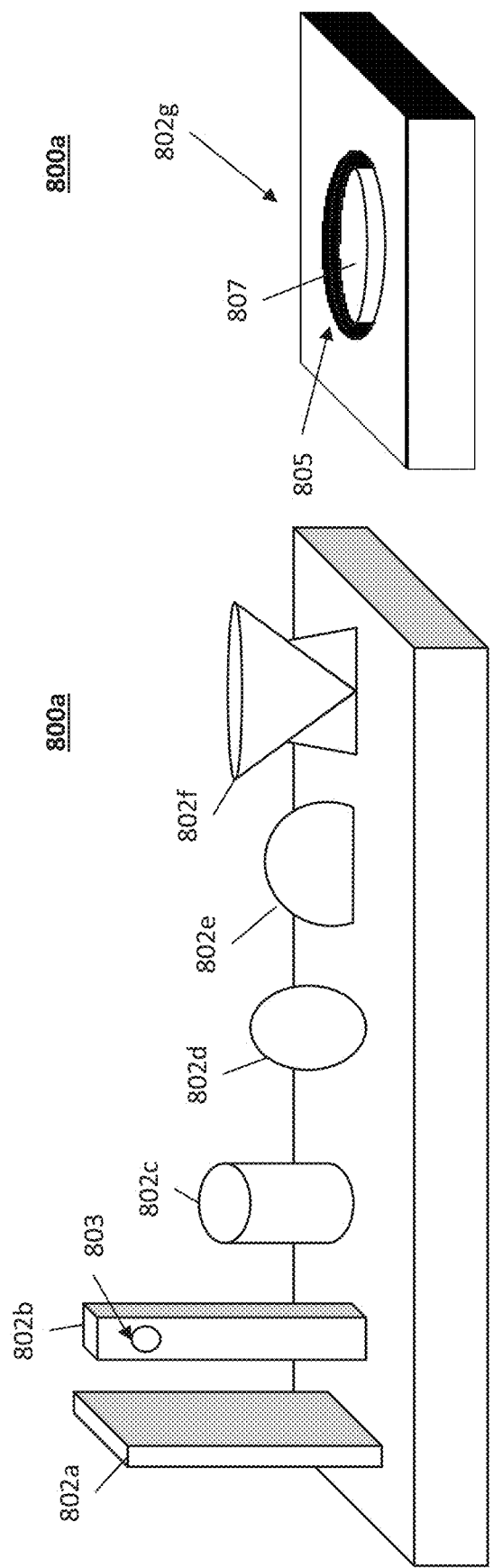
FIGS. 8a and 8b illustrate a perspective view of a static stencil having several simple example molds.

As shown in FIG. 8a, a static stencil 800a may include one or more molds 802. Each mold 802 may be configured to shape a jamming gripper 100 for easier grasping of certain target objects 112. The molds 802 may be used to shape positive and/or negative features in the jamming gripper 100. The molds 802 may be target objects 112 themselves and/or shaped similar to the target objects 112. The molds 802 may be shaped differently from the target objects 112 yet still shaped appropriately to allow the jamming gripper 100 to shape itself to a configuration that will assist in grasping and retaining the target object 112 during engagement. In some examples, the molds 802 may be configured to allow the jamming gripper 100 to strike a target object 112 rather than grasp a target object 112. In some examples, the molds 802 may be configured to allow the jamming gripper 100 to manipulate a target object 112, such as, for example, by forming the jamming gripper 100 into the shape of a key, a plate, a bowl, a cup, a flat surface (such as for pushing, for example), etc.

FIG. 8a shows a static stencil 800a having several simple example molds 802. The static stencil 800a and/or molds 802 may be pre-made, such as with a three-dimensional printer, for example. The first mold 802a is a flat rectangular wall. The wall may be helpful in some example situations that call for the gripper to emulate a hard, flat, surface, such as if a mallet type jamming gripper 100 was desired for striking, hammering, and/or tapping a target object 112. The second mold 802b is a square peg with a round hole 803. In some examples, a jamming gripper 100 may be formed around the peg. In some examples, the jamming gripper 100 may be pushed into the hole 803 while in its malleable state, and then transitioned to its rigid state to make a simple key and/or circular protrusion. The third mold 802c is a rod. The fourth mold 802d is an egg shaped mold. The fifth mold 802e is a semicircular mold. The sixth mold 802f is a hollow conical mold.

FIG. 8b illustrates a static stencil 800a having a seventh mold 802g comprising a cylindrical cavity 805 with a rod shaped ridge 807 within the cavity. The seventh mold 802g may be another example of a mold that might allow the gripper to take on the form of a simple key. Alternatively, or additionally, the seventh mold 802g may allow a jamming gripper 100 to take the form of a small drinking glass.

Figure 9A:
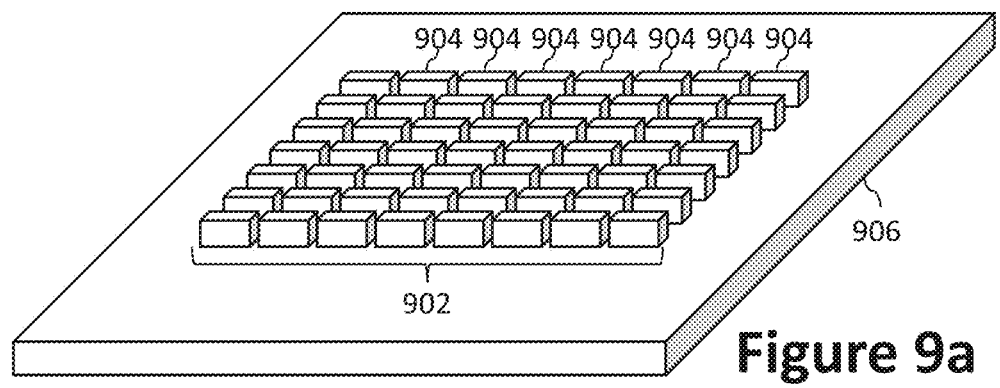
FIGS. 9a through 9c illustrate a perspective view of a dynamic stencil having a reconfigurable dynamic mold.
Figure 9B:
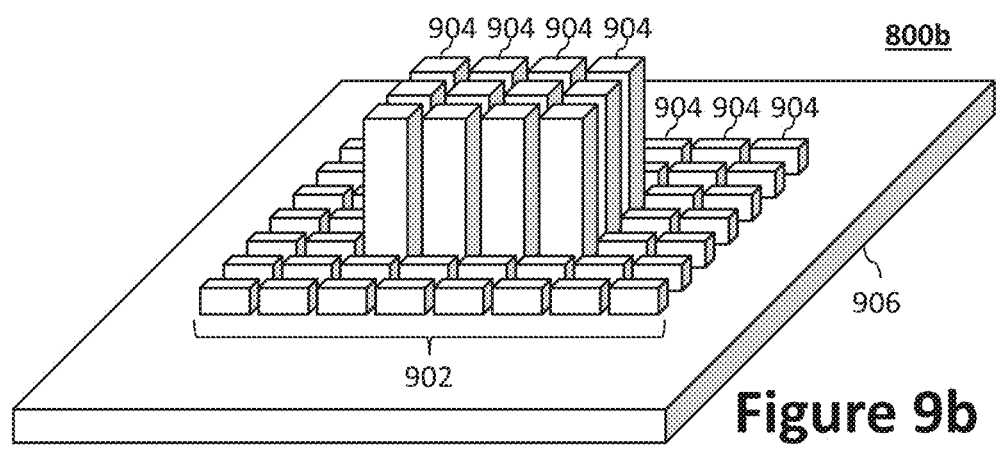
Figure 9C:
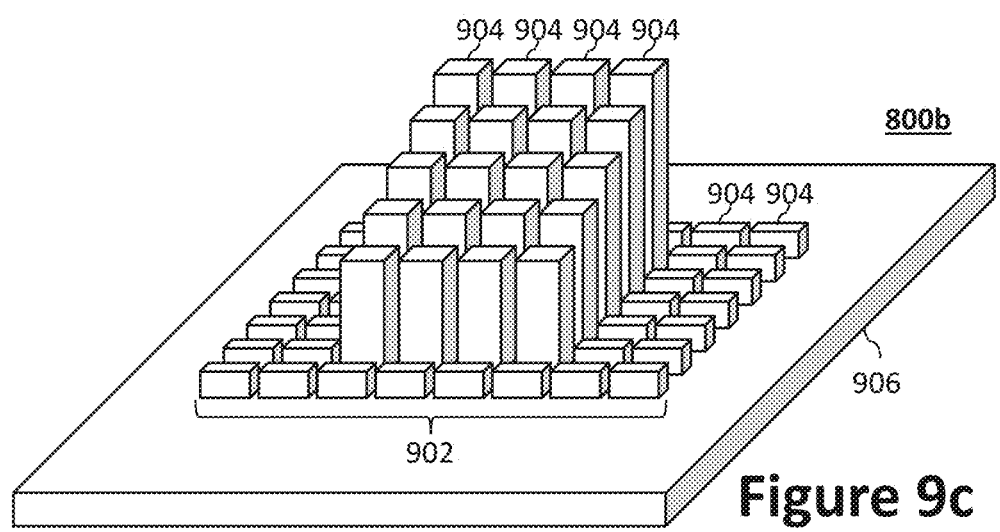

FIGS. 9a through 9c illustrate a dynamic stencil 800b, having a dynamic mold 902. While only one dynamic mold 900 is illustrated, in some examples the dynamic stencil 800b may include a plurality of dynamic molds 902. In some examples, the dynamic stencil 800b may also comprise, be coupled to, and/or otherwise include some or the entire static stencil 800a.

The dynamic mold 902 may be configured to reshape itself dynamically (e.g., in real-time or near real-time) using a plurality of pins 904 mounted to a base structure 906. The pins 904 may be coupled to one or more motors, controllers, and/or linkages configured to allow the pins to selectively and/or individually extend and/or retract according to instructions. FIG. 9a illustrates the pins 904 in a retracted state, while FIG. 9b illustrates twelve of pins 904 extended to the same height and FIG. 9c illustrates twenty of the pins 904 extended to define rows of different heights. The pins 904 may default to an extended or retracted state. In some examples, the instructions may be programmable instructions, for example. The instructions may be received from memory, for example. In some examples, the instructions may be part of another set of instructions, such as the programmable instructions from the memory 406 of the robot 300. In some examples, the instructions may be input from a user through some local and/or remote user interface. In some examples, the dynamic mold 902 may be configured to reshape itself according to input specifying the target object 112 that the robot 300 intends to engage. FIGS. 9b and 9c illustrate two example dynamic mold 902 configurations after dynamic re-shaping using the pins 904 of the dynamic mold 902.

Figure 10A:
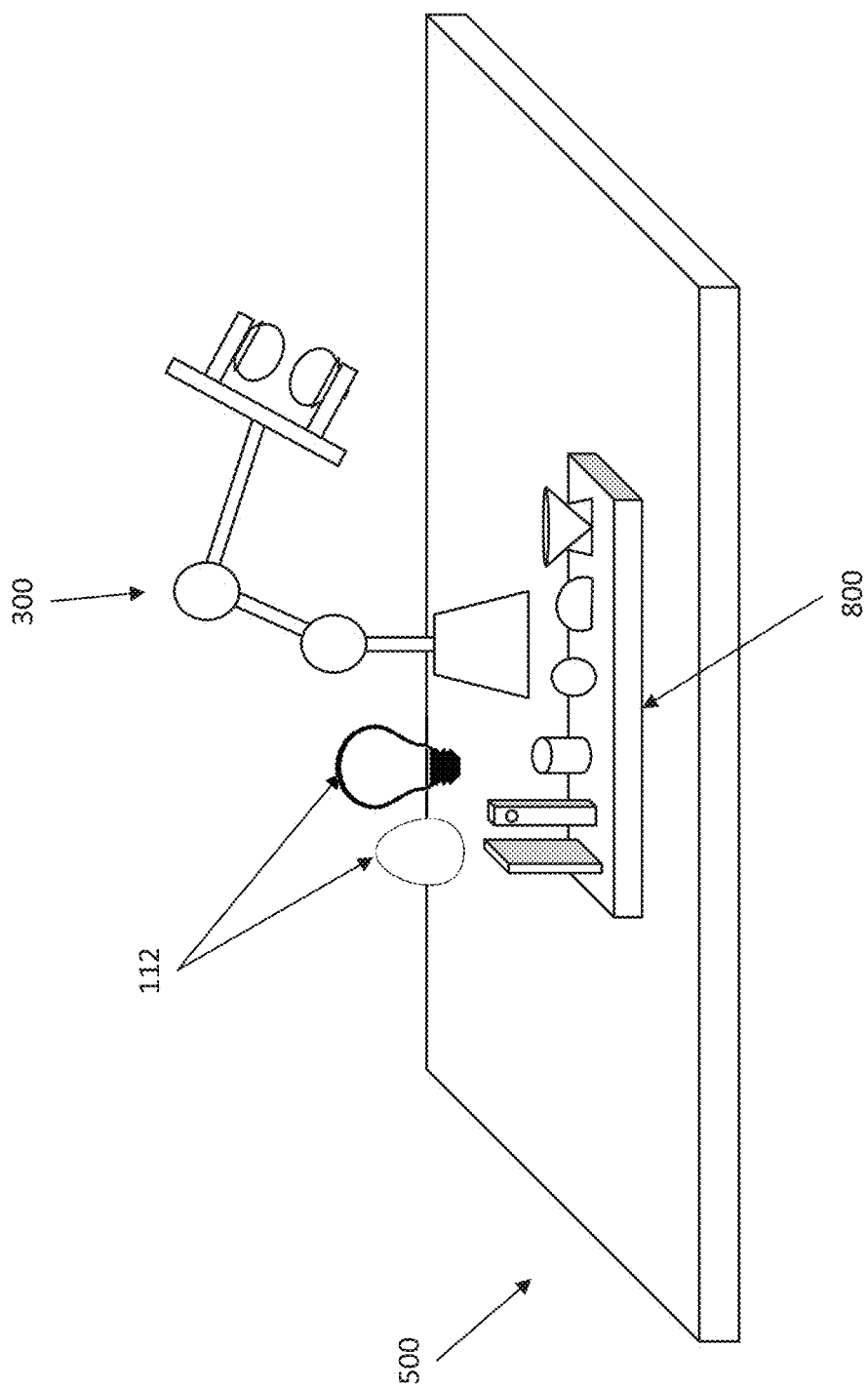
FIGS. 10a through 10c illustrate perspective views of a robot in a workspace with a stencils and target objects.
Figure 10B:
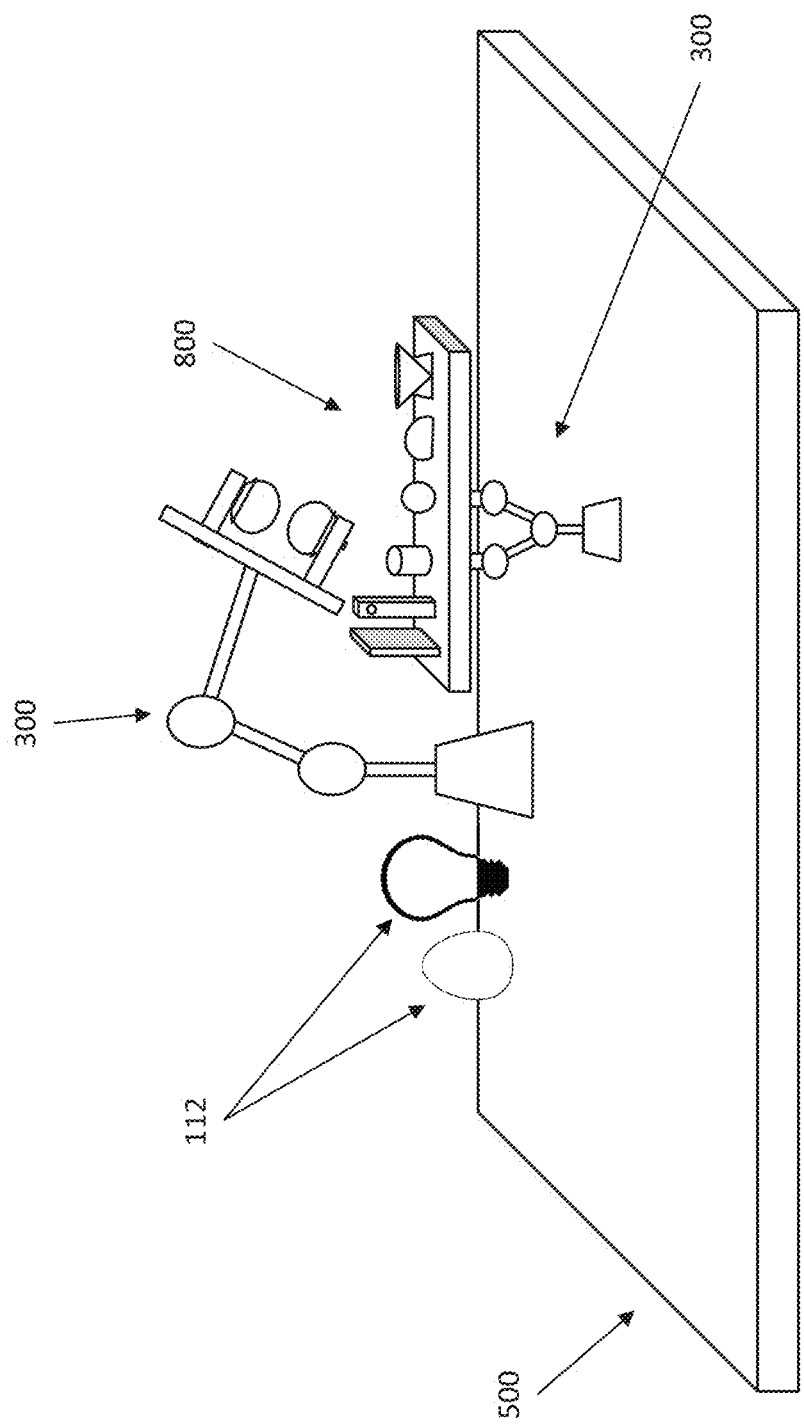
Figure 10C:
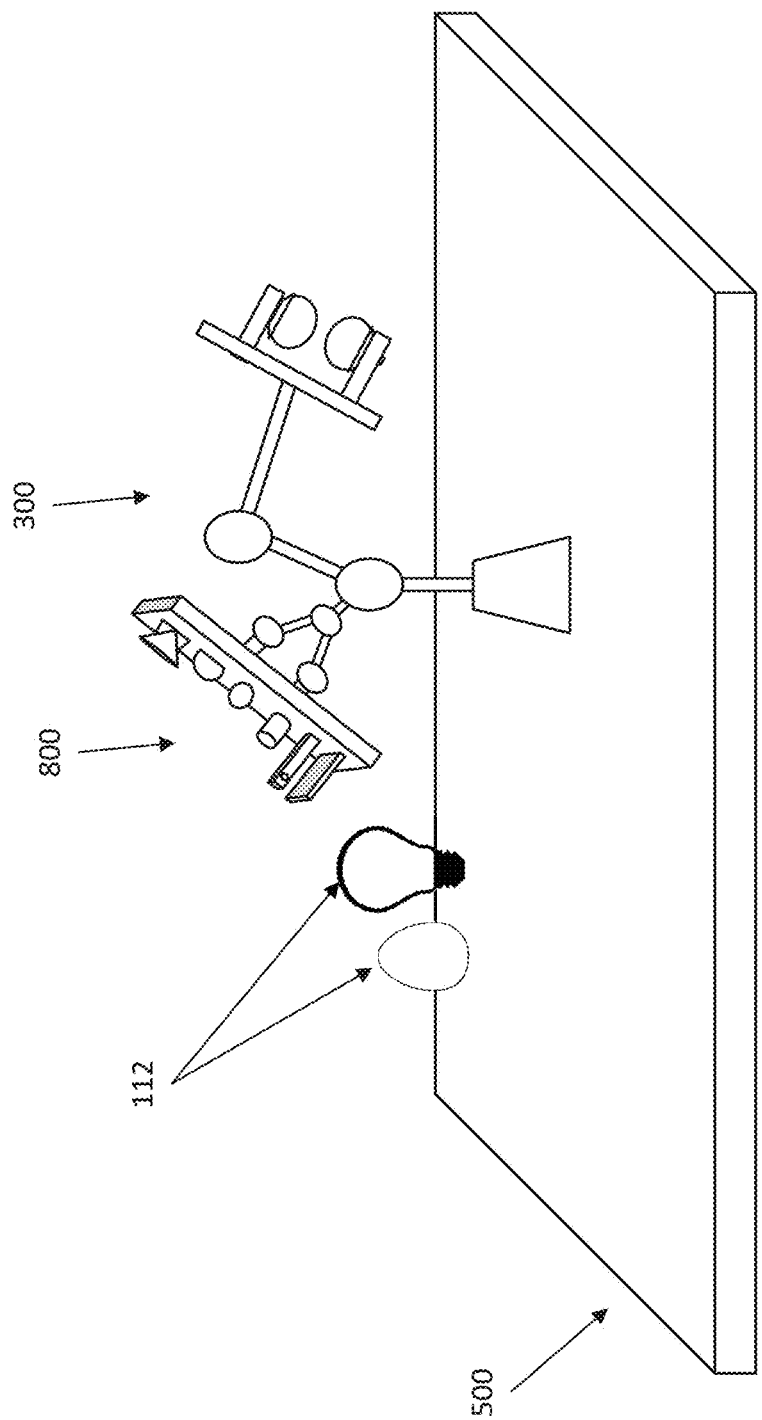

As shown in FIGS. 10a through 10c, a robot 300 may be placed in a workspace 500 with one or more stencils 800 and one or more target objects 112. The robot 300 may use the methodology previously outlined to determine if and/or when to use the stencil(s) 800 in relation to the target objects. As shown in FIG. 10c, in some examples the one or more stencils 800 may be coupled to the robot 300 itself, such as through one or more additional arms 306 and/or joints 308, and/or by being coupled to the base 302 of the robot 300. In some examples, such as shown in FIG. 10b, for example, the one or more stencils 800 may be coupled to a companion robot 300. While the examples of FIGS. 10a through 10c show a static stencil 800a, any of the examples may just as easily comprise one or more dynamic stencils 800b, and/or a combination of static stencils 800 and/or dynamic stencils 800b.

It can be appreciated that aspects of the present disclosure may be implemented by hardware, software and/or a combination thereof. The software may be stored in a non-transitory machine-readable (e.g., computer-readable) storage medium, for example, an erasable or re-writable Read Only Memory (ROM), a memory, for example, a Random Access Memory (RAM, a memory chip, a memory device, or a memory Integrated Circuit (IC), or an optically or magnetically recordable non-transitory machine-readable, While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. For example, systems, blocks, and/or other components of disclosed examples may be combined, divided, re-arranged, and/or otherwise modified. Therefore, the present method and/or system are not limited to the particular implementations disclosed. Instead, the present method and/or system will include all implementations falling within the scope of the appended claims, both literally and under the doctrine of equivalents.

What is claimed is:

1. A robot system for grasping a target object, the robot system comprising:
   a robot equipped with an appendage having a gripper, wherein the gripper includes a pressure control port;
   a pressure regulator fluidly coupled to the gripper via the pressure control port, wherein the pressure regulator is configured to modify an internal pressure of the gripper, so as to phase transition the gripper between a malleable state and a rigid state;
   a plurality of molds to which the gripper may conform when in a malleable state, so as to define a desired rigid form for the gripper; and
   a sensor to determine at least one characteristic of the target object, wherein the robot is configured to select a desired mold from the plurality of molds based at least in part on the at least one characteristic of the target object.

2. The robot system of claim 1, wherein the sensor is arranged to monitor the plurality of molds, and wherein the robot is equipped with an actuation mechanism to guide the appendage toward the desired mold based at least in part on an input from the sensor.

3. The robot system of claim 1, wherein the gripper comprises a deformable membrane having a granular material disposed therein.

4. The robot system of claim 3, wherein the granular material comprises at least one of sand, coffee grounds, beans, rice, or salt.

5. The robot system of claim 1, wherein the plurality of molds comprises a dynamic mold configured to change shape dynamically.

6. The robot system of claim 5, wherein the dynamic mold is operably coupled to a user interface and is configured to change shape in response to a user input at the user interface.

7. The robot system of claim 1, wherein at least one of the plurality of molds is coupled to the robot.

8. The robot system of claim 1, wherein the desired mold is shaped to approximate a shape of the target object.

9. The robot system of claim 1, wherein the desired mold is printed via a three-dimensional printer.

10. A method of grasping a target object via a gripper that is in communication with a pressure regulator, wherein the gripper comprises a deformable membrane configured to phase transition between a malleable state and a rigid state as a function of pressure imparted by the pressure regulator, the method comprising the steps of:
   determining at least one characteristic of the target object via a sensor;
   selecting a desired mold from a plurality of molds based at least in part on the at least one characteristic;
   maneuvering the gripper into contact with the desired mold while the gripper is in a malleable state, wherein the desired mold corresponds at least in part to a shape of the target object;
   transitioning the gripper from the malleable state to the rigid state, such that the gripper conforms to a shape of the desired mold;
   maneuvering the gripper out of contact with the desired mold while the gripper is in the rigid state; and
   manipulating the target object with the gripper while the gripper is in the rigid state.

11. The method of claim 10, wherein the step of maneuvering the gripper comprises maneuvering the gripper based on an input from the sensor, wherein the sensor is arranged to monitor the plurality of molds and to guide the gripper toward the desired mold based at least in part on the input from the sensor.

12. The method of claim 10, wherein the gripper is operatively coupled to a robot.

13. The method of claim 10, wherein the at least one characteristic of the target object comprises at least one of a shape of the target object, a material of the target object, and a durability of the target object.

14. The method of claim 10, wherein the plurality of molds comprises a dynamic mold configured to change shape dynamically.

15. The method of claim 14, wherein the dynamic mold is coupled to a user interface and is configured to change shape in response to a user input at the user interface.

16. A robot system for grasping a target object, the robot system comprising:
   a robot equipped with an appendage having a gripper;
   a pressure regulator fluidly coupled to the gripper via a pressure control port, wherein the pressure regulator is configured to modify an internal pressure of the gripper, so as to phase transition the gripper between a malleable state and a rigid state; and
   a dynamic mold to which the gripper may conform when in a malleable state, so as to define a desired rigid form for the gripper, wherein the dynamic mold is configured to change shape to approximate a shape of the target object.

17. The robot system of claim 16, wherein the dynamic mold is operably coupled to a user interface, wherein the dynamic mold is configured to adjust its shape in response to a user input at the user interface.

18. The robot system of claim 16, wherein the gripper comprises a deformable membrane having a granular material disposed therein.

19. The robot system of claim 16, further comprising a sensor to determine at least one characteristic of the target object, wherein the robot is configured to adjust the dynamic mold based at least in part on the at least one characteristic of the target object.

20. The robot system of claim 16, wherein the dynamic mold is coupled to the robot.

* * * * *